United States Patent [19]
Rosenberg

[11] Patent Number: 5,339,860
[45] Date of Patent: Aug. 23, 1994

[54] FLUID PRESSURE REGULATOR

[76] Inventor: Peretz Rosenberg, 30 046, Moshav Beit Shearim, Israel

[21] Appl. No.: 162,929

[22] Filed: Dec. 8, 1993

[30] Foreign Application Priority Data

Dec. 25, 1992 [IL] Israel ..................................... 104232

[51] Int. Cl.⁵ ........................................... G05D 16/10
[52] U.S. Cl. .................................. 137/343; 137/505.26
[58] Field of Search .................. 137/505.25, 505.26, 137/505.27, 505.28, 343

[56] References Cited

U.S. PATENT DOCUMENTS

| | | | |
|---|---|---|---|
| 449,222 | 3/1891 | Kimball | 137/505.28 X |
| 673,732 | 5/1901 | Shoemaker | 137/505.28 |
| 2,590,838 | 4/1952 | Boggs | 137/505.25 |
| 2,726,790 | 12/1955 | Woelfer | 137/505.25 X |
| 2,731,034 | 1/1956 | Dinkelkamp | 137/505.25 X |
| 3,586,033 | 6/1971 | Hieber | 137/505.26 X |
| 4,064,899 | 12/1977 | Lehmann | 137/505.25 X |

Primary Examiner—Stephen M. Hepperle
Attorney, Agent, or Firm—Benjamin J. Barish

[57] ABSTRACT

A fluid pressure regulator includes a cylinder fixed within a cavity, a sealing disc carried at the closed end of the cylinder, and a piston displaceable within the cylinder, the interior of the cylinder being vented to the atmosphere. The piston is of larger cross-sectional area than the sealing disc and has a stem of smaller cross-sectional area than, and passing through, the sealing disc. The stem carries a valve member movable by the displacement of the piston, from a fully open position towards and away from a flow control opening to control the flow therethrough to the housing outlet.

16 Claims, 2 Drawing Sheets

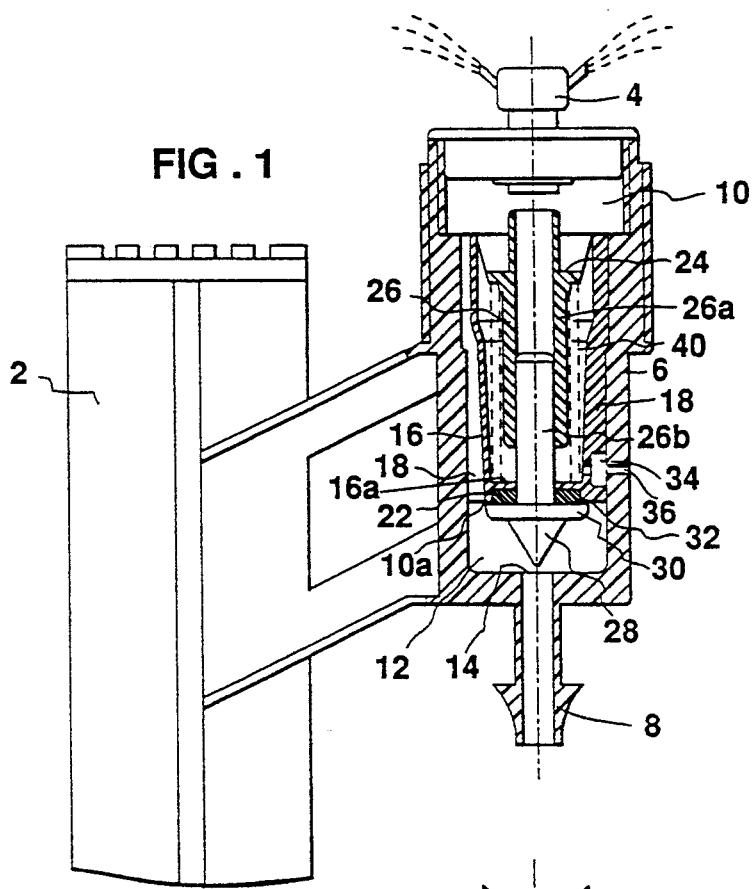
FIG. 1
FIG. 2
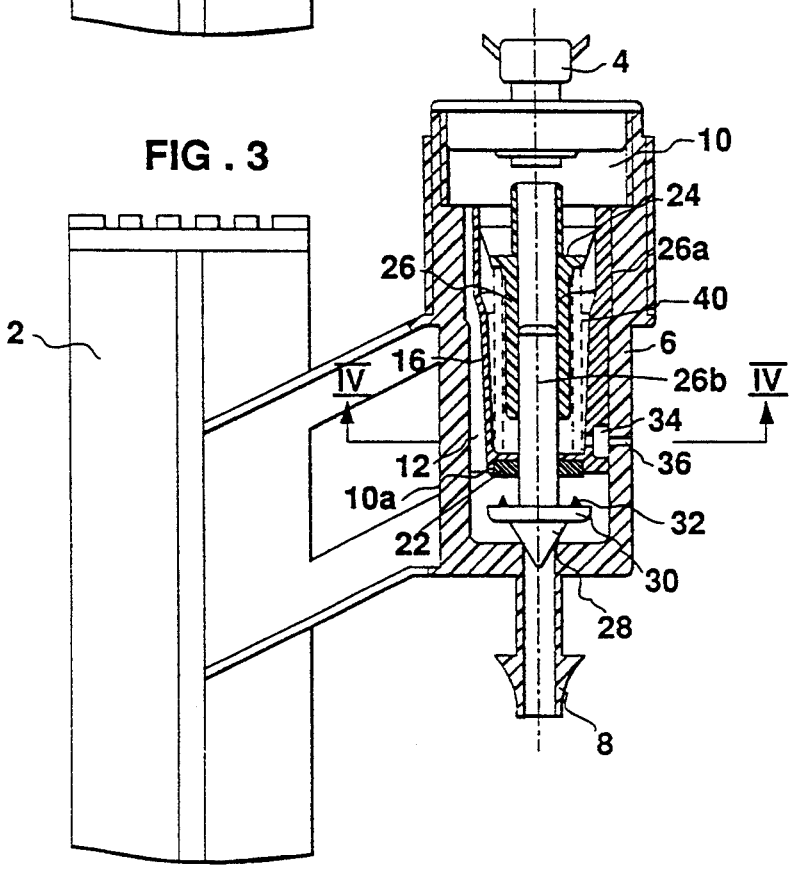
FIG. 3
FIG. 4

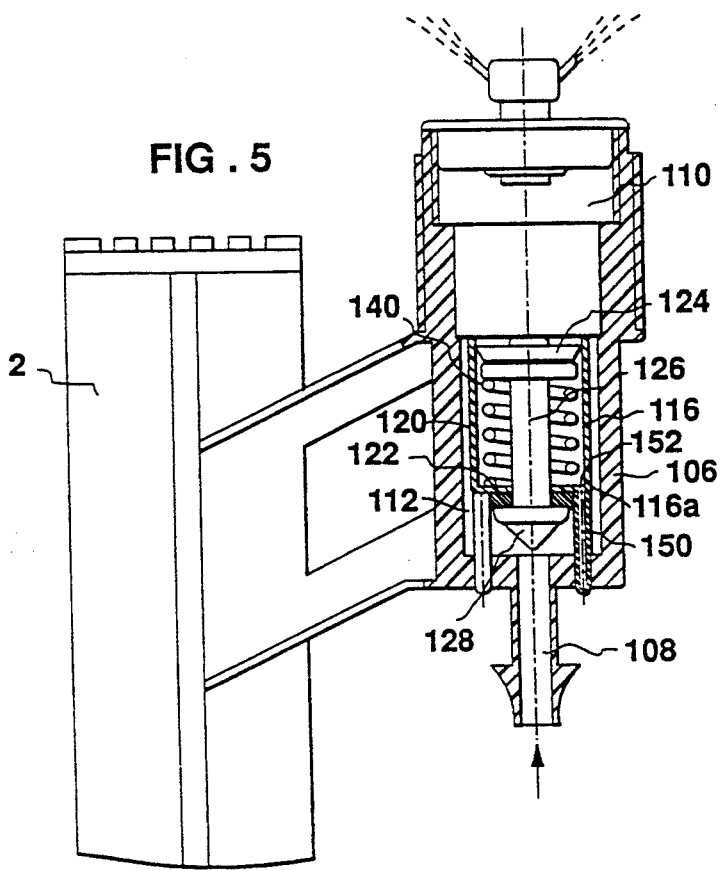
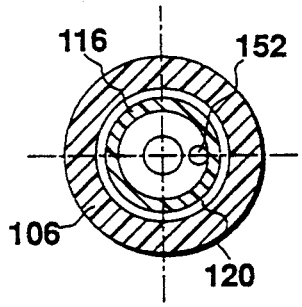
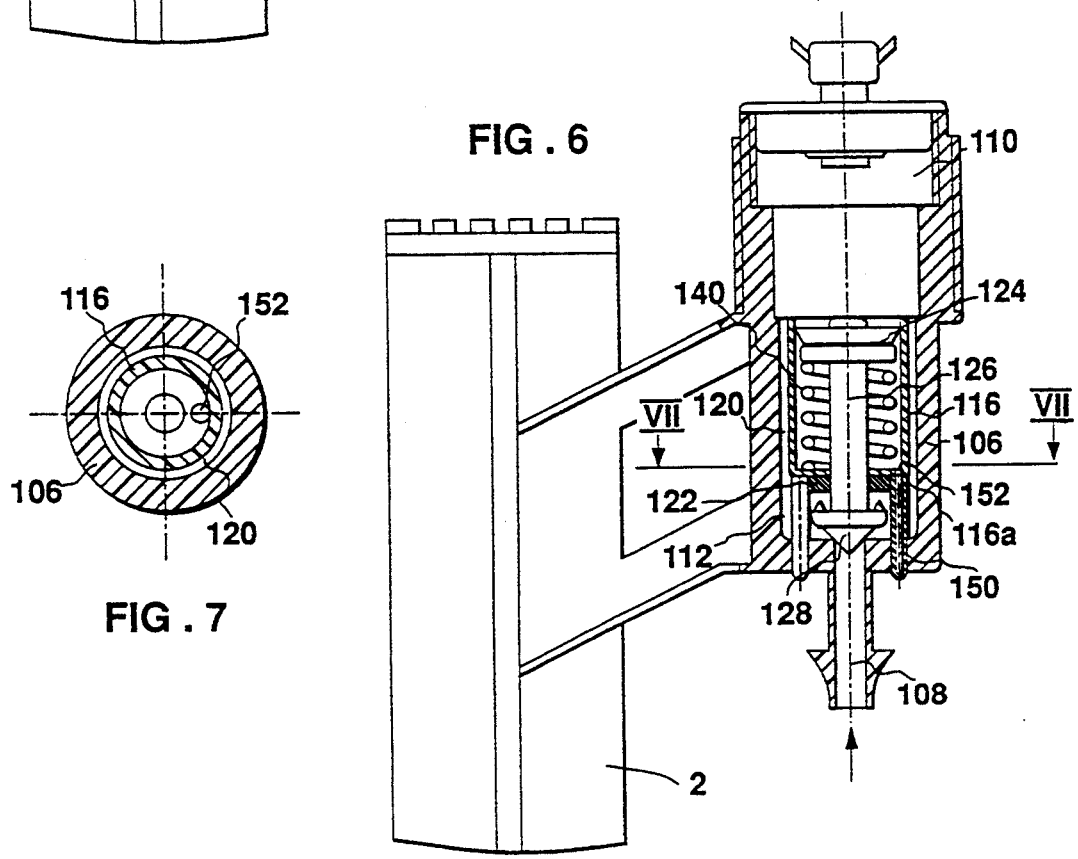

FLUID PRESSURE REGULATOR

FIELD AND BACKGROUND OF THE INVENTION

The present invention relates to fluid pressure regulators, and particularly to those which regulate the outlet flow of the fluid in response to variations in the inlet and/or outlet pressure. The invention is especially useful as a regulator for water sprinklers or other irrigation devices, and is therefore described below with respect to such an application.

Many types of fluid pressure regulators are known. However, the known pressure regulators generally operate within a relatively small range of flow rates. Thus, if a pressure regulator designed for one particular flow rate is used in an application involving a higher flow rate, the pressure regulator tends to cause higher losses, and thereby tends to reduce the outlet regulated pressure. Other known pressure regulators are of relatively complicated construction and therefore expensive to produce and/or to maintain.

OBJECT AND BRIEF SUMMARY OF THE INVENTION

An object of the present invention is to provide a fluid pressure regulator having advantages in one or both of the above respects.

According to the present invention, there is provided a fluid pressure regulator, comprising: a housing having an inlet at one end, an outlet at another end, and a connecting passageway including a cavity and a flow-control opening connecting the inlet to the outlet; a cylinder fixed within the cavity and closed at an end thereof facing the fluid control opening, the opposite end of the cylinder being open to the housing outlet; a sealing disc carried at the closed end of the cylinder; and a piston displaceable within the cylinder adjacent the open end so as to be exposed to the pressure at the housing outlet. The interior of the cylinder is vented to the atmosphere. The piston is of larger cross-sectional area than the sealing disc and has a stem of smaller cross-sectional area than, and passing through, the sealing disc. The stem carries a valve member movable by the displacement of the piston, from a fully open position towards and away from the flow control opening to control the flow therethrough to the housing outlet. The piston stem further includes an enlarged annular surface which engages the sealing disc in the fully open position of the valve member with respect to the flow control opening. A spring urges the piston towards the fully open position of the valve member.

As will be described more particularly below, the arrangement is such that in the fully open position of the valve member, the inlet pressure applied to the cross-sectional area of the sealing disc aids the spring in maintaining the valve member in its fully open condition against the action of the outlet pressure on the piston. However, as soon as the outlet pressure on the piston increases to the point where the valve member moves away fom the sealing disc, the annular surface of the stem disengages from the sealing disc, and the inlet pressure is now applied to the smaller cross-sectional area of the stem to aid the spring in displacing the valve member towards or away from the fluid control opening. Thus, normally the valve member is firmly maintained in its fully open position and thereby minimizes pressure losses, but as soon as the regulated pressure is exceeded, the valve mamber moves to its regulating position with a quick or snap-action to regulate the flow through the flow control opening.

As will be described more particularly below, a fluid pressure regulator constructed in accordance with the foregoing features is less sensitive than prior regulators to the output flow rates and tends to exhibit substantially uniform regulation for large flow rates as well as for small flow rates. Thus, when the flow rate increases, the valve member moves away from the fluid control opening to thereby increase the cross-sectional area of the passageway. Moreover, such fluid pressure regulators can be constructed of a few simple parts which can be produced in volume and at low cost and which are easy to assemble and to maintain.

Further features and advantages of the invention will be apparent from the description below.

BRIEF DESCRIPTION OF THE DRAWINGS

The invention is herein described, by way of example only, with reference to the accompanying drawings, wherein:

FIG. 1 is a longitudinal sectional view illustrating one form of fluid pressure regulator constructed in accordance with the present invention assembled with a water sprinkler, the regulator being shown in its fully open position;

FIG. 2 is a top plan view of the regulator of FIG. 1 with the water sprinkler removed;

FIG. 3 is a view similar to that of FIG. 1 but showing the regulator in its fully closed position;

FIG. 4 is a sectional view along line IV—IV of FIG. 3;

FIG. 5 is a longitudinal sectional view of another regulator constructed in accordance with the present invention, the valve member being in its fully open position;

FIG. 6 is a view similar to that of FIG. 5, but showing the valve member in its fully closed poition;

and FIG. 7 is a transverse sectional view along line VII—VII of FIG. 6.

DESCRIPTION OF PREFERRED EMBODIMENTS

The fluid pressure regulator illustrated in FIGS. 1–4 is part of an assembly including a stand 2 having a stake (not shown) to be staked into the ground, and a water sprinkler 4 or other water irrigation device to be supplied with pressurized water via the pressure regulator.

The pressure regulator includes a housing 6 integrally formed with stand 2 and having an inlet 8 at one end to be coupled to a supply of pressurized water, and an outlet 10 at the opposite end for receiving the water sprinkler 4. Housing 6 is further formed with a connecting passageway including a cavity 12 and a flow-control opening 14 connecting inlet 8 to the outlet 10.

A cylinder 16 is fixed within cavity 12. The outer surface of the cylinder is formed with a plurality of longitudinally-extending, circumferentially-spaced ribs 18 which enable the cylinder to be frictionally-fitted within cavity 12 such that the water flows via the spaces 20 between the cylinder ribs 18 from the inlet 8 to the outlet 10. The end of cylinder 16 facing the flow control opening 14 is closed by an end wall 16a having a resilient sealing disc 22 fixed to the outer surface, whereas the opposite end of the cylinder is open.

A piston 24 is displaceable within cylinder 16. Piston 24 includes a stem 26 passing through the cylinder end wall 16a and its sealing disc 22. Stem 26 carries a valve member 28 movable, by the displacement of the piston, towards and away from the flow control opening 14 to control the flow therethrough to the housing outlet 10.

Stem 26 is made of a hollow section 26a integrally formed with piston 24, and a rod section 26b fixed to section 26a and passing through the cylinder end wall 16a and the sealing disc 22. Stem section 26b is integrally formed with the valve member 28, and is further formed with an enlarged annular surface 30 which engages the sealing disc 22 in the fully open position of the valve member 28, as illustrated in FIG. 1.

The sealing disc 22 is of a soft resilient material, preferably an elastomeric material such as silicone rubber. The enlarged annular surface 30 of stem section 26b is formed with an annular array of projections 32 (see particularly FIG. 3) facing the sealing disc 22. Projections 32 become embedded in the sealing disc in the fully open position of the valve member, but prevent sticking of the enlarged annular surface 30 of stem section 26b to the sealing disc when the valve member 28 moves away from the flow control opening 14.

The interior of cylinder 16 is vented to the atmosphere. For this purpose, one of the ribs 18 in the outer surface of the cylinder 16 is formed with a bore 34 in alignment with a bore 36 formed in housing 6.

The illustrated regulator further includes a coil spring, shown by broken lines at 40, within the cylinder 16 and urging the piston 24 towards the fully open position of the valve member 28 as illustrated in FIG. 1.

As can be seen in the drawings, the piston 24 is of larger cross-sectional area than the sealing disc 22, and the stem section 26b of the piston is of smaller cross-sectional area than the sealing disc. As one example, the outer diameter of piston 24 may be 10 mm, the outer diameter of the sealing disc 22 may be 6 mm, and the outer diameter of stem section 26b may be 3 mm.

The regulator illustrated in FIGS. 1–4 operates as follows:

Spring 40 normally urges piston 24 to the fully open position of valve member 28, as illustrated in FIG. 1. It will be seen that in this position, the complete outer diameter of the annular surface 30 contacting the sealing disc 22 is subjected to the inlet pressure aiding the spring 40 in maintaining the valve member 28 in its fully open position. On the other hand, the outlet pressure applied against piston 24 tends to move valve member 28 towards the flow control opening 14.

Thus, the valve member 28 will normally be maintained in its fully open position illustrated in FIG. 1 until the pressure at the outlet 10, when multiplied by the surface area of the piston 24, produces a sufficient force to overcome the force of the spring 40 and the force produced by the inlet pressure against annular surface 30 of the piston stem section 26b. As soon as this occurs, piston 24 moves downwardly to separate the annular surface 30 of stem section 26b from the sealing disc 22. The force produced by the inlet pressure aiding the spring 40 in maintaining the valve in its fully open position is now reduced, because of the smaller cross-sectional area of valve stem 26b which is now effective, rather than the larger cross-sectional area of the annular surface 30. Accordingly, the valve member will move from its fully open position against the sealing disc 22 with a quick, snap-action movement to its regulating position away from the sealing disc, and will thereafter move towards or away from the flow control opening 14 in response to variations in the outlet pressure.

The pressure regulator illustrated in FIGS. 1–4 has also been found to be less sensitive to changes in flow rates. Thus, if the flow rate into the inlet increases, the valve member 28 tends to move its enlarged annular surface 30 away from the flow control opening 14 to thereby accommodate the larger flow rates, and thereby to reduce the higher losses generally exhibited by many of the known pressure regulators.

It will also be seen that the pressure regulator illustrated in FIGS. 1–4 is constructed of a few simple parts which can be produced at low cost and in volume, and which can be quickly assembled and easily maintained.

FIGS. 5–7 illustrate a pressure regulator very similar to that of FIGS. 1–4 with a number of changes. To facilitate understanding, those parts which generally correspond to the above-described parts in the pressure regulator of FIGS. 1–4 are correspondingly numbered, but increased by "100".

Thus, in the pressure regulator of FIGS. 5–7, the cylinder 116 is of smaller outer diameter than the inner diameter of the cavity 112 formed in the housing 106 so as to provide an annular space 120 for the flow of the water from the inlet 108 to the outlet 110. The cylinder 116 is fixed within cavity 112 by a plurality of pins 150 which are frictionally-fitted within openings formed in the housing 106. In the example illustrated, there preferably are three such pins 150.

In addition, one of the pins 150 is used for venting the interior of the cylinder 116 to the atmosphere. For this purpose, a bore 152 is formed through the closed end 116a of the cylinder 116 and one of the pins 150.

The pressure regulator illustrated in FIGS. 5–7 also includes a sealing disc 122 fixed to the closed end of the cylinder 116, a piston 124 displaceable within the cylinder and connected by a stem 126 passing through the sealing disc 122 and connected to a valve member 128, and a spring 140 normally urging the piston 124 in the fully open position of the valve member. The pressure regulator illustrated in FIGS. 5–7 is otherwise constructed, and operates, in substantially the same manner as described above with respect to FIGS. 1–4.

While the invention has been described with respect to two preferred embodiments, it will be appreciated that these are set forth merely for purposes of example, and that many other variations, modifications and applications of the invention may be made.

What is claimed is:

1. A fluid pressure regulator, comprising:
   a housing having an inlet at one end, an outlet at another end, and a connecting passageway including a cavity and a flow-control opening connecting said inlet to said outlet;
   a cylinder fixed within said cavity and closed at an end thereof facing the fluid control opening, the opposite end of the cylinder being open to said housing outlet;
   a sealing disc carried at said closed end of the cylinder;
   a piston displaceable within said cylinder adjacent said open end so as to be exposed to the pressure at said housing outlet;
   the interior of the cylinder being vented to the atmosphere;
   said piston being of larger cross-sectional area than said sealing disc and having a stem of smaller crosssectional area than, and passing through, said sealing disc;

said stem carrying a valve member movable by the displacement of said piston, from a fully open position towards and away from said flow control opening to control the flow therethrough to said housing outlet;

said piston stem further including an enlarged annular surface which engages said sealing disc in the fully open position of the valve member with respect to the flow control opening;

and a spring urging said piston towards said fully open position of the valve member.

2. The regulator according to claim 1, wherein said sealing disc is of a soft resilient material, and said enlarged annular surface of the stem is formed with projections facing the sealing disc and effective to become embedded therein in the fully open position of the valve member, but to prevent sticking of the enlarged annular surface to the sealing disc when the valve member moves away therefrom.

3. The regulator according to claim 2, wherein said sealing disc is formed of elastomeric material.

4. The regulator according to claim 1, wherein said cylinder is formed with a plurality of axiallyextending, circumferentially-spaced ribs frictionally fixing the cylinder within said housing cavity such that the fluid flows from said flow control opening to the housing outlet via the spaces between said ribs.

5. The regulator according to claim 4, wherein at least one of said ribs is formed with said vent venting the interior of the cylinder to the atmosphere.

6. The regulator according to claim 1, wherein said cylinder is of smaller outer diameter than said cavity and is formed with a plurality of pins frictionally-fitting the cylinder within the cavity such that the fluid flows from said flow control opening to the housing outlet via the space between the cylinder and the inner surface of the cavity.

7. The regulator according to claim 6, wherein at least one of said pins is formed with said vent venting the interior of the cylinder to the atmosphere.

8. The regulator according to claim 1, wherein the outlet end of said housing includes a socket for receiving a water irrigation device.

9. The regulator according to claim 8, wherein said housing is integrally formed with a stand for staking the housing and the water irrigation device into the ground.

10. A fluid pressure regulator, comprising:

a housing having an inlet at one end, an outlet at another end, and a connecting passageway including a cavity and a flow-control opening connecting said inlet to said outlet;

a cylinder fixed within said cavity and closed at an end thereof facing the fluid control opening, the opposite end of the cylinder being open to said housing outlet, said cylinder being formed with a plurality of axially-extending, circumferentially-spaced ribs frictionally fixing the cylinder within said housing cavity such that the fluid flows from said flow control opening to the housing outlet via the spaces between said ribs;

a sealing disc of elastomeric material carried at said closed end of the cylinder;

a piston displaceable within said cylinder adjacent said open end so as to be exposed to the pressure at said housing outlet;

the interior of the cylinder being vented to the atmosphere;

said piston being of larger cross-sectional area than said sealing disc and having a stem of smaller crossssectional area than, and passing through, said sealing disc;

said stem carrying a valve member movable by the displacement of said piston, from a fully open position towards and away from said flow control opening to control the flow therethrough to said housing outlet;

said piston stem further including an enlarged annular surface which engages said sealing disc in the fully open position of the valve member with respect to the flow control opening;

and a spring urging said piston towards said fully open position of the valve member.

11. The regulator according to claim 10, wherein said sealing disc is of a soft resilient material, and said enlarged annular surface of the stem is formed with projections facing the sealing disc and effective to become embedded therein in the fully open position of the valve member, but to prevent sticking of the enlarged annular surface to the sealing disc when the valve member moves away therefrom.

12. The regulator according to claim 10, wherein at least one of said ribs is formed with said vent venting the interior of the cylinder to the atmosphere.

13. The regulator according to claim 10, wherein said cylinder is of smaller outer diameter than said cavity and is formed with a plurality of pins frictionally-fitting the cylinder within the cavity such that the fluid flows from said flow control opening to the housing outlet via the space between the cylinder and the inner surface of the cavity.

14. The regulator according to claim 13, wherein at least one of said pins is formed with said vent venting the interior of the cylinder to the atmosphere.

15. The regulator according to claim 10, wherein the outlet end of said housing includes a socket for receiving a water irrigation device.

16. The regulator according to claim 15, wherein said housing is integrally formed with a stand for staking the housing and the water irrigation device into the ground.

* * * * *